US012609347B2

(12) United States Patent
Barker et al.

(10) Patent No.: US 12,609,347 B2
(45) Date of Patent: Apr. 21, 2026

(54) SODIUM-ION BATTERY PACK

(71) Applicant: FARADION LIMITED, South Yorkshire (GB)

(72) Inventors: Jeremy Barker, Chipping Norton (GB); Christopher Wright, Oxford (GB); Noel Roche, Abingdon (GB)

(73) Assignee: Faradion Limited, South Yorkshire (GB)

( * ) Notice: Subject to any disclaimer, the term of this patent is extended or adjusted under 35 U.S.C. 154(b) by 785 days.

(21) Appl. No.: 17/792,903

(22) PCT Filed: Feb. 12, 2021

(86) PCT No.: PCT/GB2021/050356

§ 371 (c)(1),
(2) Date: Jul. 14, 2022

(87) PCT Pub. No.: WO2021/161044

PCT Pub. Date: Aug. 19, 2021

(65) Prior Publication Data

US 2024/0234796 A1 Jul. 11, 2024

(30) Foreign Application Priority Data

Feb. 13, 2020 (GB) ..................................... 2002016

(51) Int. Cl.
| | |
|---|---|
| *H01M 10/054* | (2010.01) |
| *H01M 10/44* | (2006.01) |
| *H02J 7/00* | (2006.01) |
| *H01M 10/42* | (2006.01) |

(52) U.S. Cl.
CPC ....... *H01M 10/054* (2013.01); *H01M 10/441* (2013.01); *H02J 7/855* (2026.01); *H01M 2010/4271* (2013.01); *H02J 2207/20* (2020.01)

(58) Field of Classification Search
CPC ............. H01M 10/054; H01M 10/441; H01M 2010/4271; H02J 7/0063; H02J 2207/20
See application file for complete search history.

(56) References Cited

U.S. PATENT DOCUMENTS

| | | | |
|---|---|---|---|
| 5,161,097 A | 11/1992 | Ikeda | |
| 2005/0191528 A1* | 9/2005 | Cortes ................... | H01M 10/44 320/135 |
| 2005/0280398 A1 | 12/2005 | Lee et al. | |
| 2008/0238369 A1* | 10/2008 | Cintra ................. | H01M 10/052 320/155 |

(Continued)

FOREIGN PATENT DOCUMENTS

| | | |
|---|---|---|
| CN | 1898846 A | 1/2007 |
| CN | 110729798 A | 1/2020 |

(Continued)

OTHER PUBLICATIONS

JP-2012079687MT (Year: 2008).*

(Continued)

*Primary Examiner* — Alexander Usyatinsky
(74) *Attorney, Agent, or Firm* — Meunier Carlin & Curfman LLC

(57) ABSTRACT

The invention relates to a sodium-ion battery pack comprising one or more sodium-ion cells and one or more voltage converters. Methods and uses of such a sodium-ion battery pack are also disclosed.

19 Claims, 8 Drawing Sheets

Sodium Ion Battery

BMS

Energy from Battery

56V – 35V

Electronic Load

Data stream from BMS:
Power (Calculated)
Pack voltage
Current
Time

Data stream from Electronic load:
Power (Load)
Voltage
Current
Time

(56)                References Cited

U.S. PATENT DOCUMENTS

| | | | | |
|---|---|---|---|---|
| 2008/0238836 | A1 | 10/2008 | Cintra et al. | |
| 2012/0047725 | A1* | 3/2012 | Gschweitl | H01M 10/0525 |
| | | | | 29/730 |
| 2017/0028510 | A1 | 2/2017 | Shin | |
| 2017/0310126 | A1 | 10/2017 | Nguyen | |
| 2017/0373310 | A1 | 12/2017 | Whittingham et al. | |

FOREIGN PATENT DOCUMENTS

| | | | | | |
|---|---|---|---|---|---|
| JP | 200614587 | A | | 1/2006 | |
| JP | 2012079687 | A | * | 4/2012 | H01M 10/054 |
| JP | 201763543 | A | | 3/2017 | |
| JP | 2017112729 | A | | 6/2017 | |
| JP | 2017181326 | A | | 10/2017 | |
| WO | 2018154206 | A1 | | 8/2018 | |

OTHER PUBLICATIONS

The decision of JPO to grant a Patent for Application JP 2022548874 (Year: 2025).*

International Preliminary Report on Patentability mailed on Jan. 10, 2022, in PCT/GB2021/050356.
Notice of Refusal mailed on Mar. 25, 2025, in Chinese Patent Application No. 2022-548874.
International Search Report and Written Opinion received in PCT/GB2021/050356 dated May 28, 2021, 12 pages.
Third Party Observations issued on Jan. 1, 2023, in European Application No. EP21706377.5.
Third Party Observations issued on Jun. 22, 2023, in European Application No. EP21706377.5.
Website extract from https://electronics.stackexchange.com/questions/466283/3-7v-to-3-3v-voltage-regulator—comments posted on Nov. 7-8, 2019.
Introduction to DC-DC Converters, https://www.digikey.co.uk/en/maker/blogs/introduction-to-dc-dc-converters, Feb. 18, 2016.
Office Action mailed on Jan. 9, 2025, in Chinese Patent Application No. 202180012463.8.
Search Report mailed on Jan. 9, 2025, in Chinese Patent Application No. 202180012463.8.
Office Action mailed on Jun. 7, 2025, in Chinese Application No. 202180012463.8.
Examination Report mailed on Jul. 4, 2025, in European Application No. 21706377.5.

* cited by examiner

SODIUM-ION BATTERY PACK

FIELD OF THE INVENTION

The present invention relates to a sodium-ion battery pack which is designed to enable the efficient delivery of the energy available within the sodium-ion cells present in the battery pack to an electrical device. The present invention also relates to a method of efficiently delivering the energy available within a sodium-ion cell and to electrical devices which employ a sodium-ion battery pack according to the present invention. For the avoidance of any doubt, supercapacitors are not included within the scope of the present invention.

BACKGROUND OF THE INVENTION

Sodium-ion batteries are analogous in many ways to the lithium-ion batteries that are in common use today; they are both reusable secondary batteries that comprise an anode (negative electrode), a cathode (positive electrode) and an electrolyte material, both are capable of storing energy, and they both charge and discharge via a similar reaction mechanism. When a sodium-ion (or lithium-ion) battery is charging, $Na^+$ (or $Li^+$) ions de-intercalate from the cathode and insert into the anode. Meanwhile charge balancing electrons pass from the cathode through the external circuit containing the charger and into the anode of the battery. During discharge the same process occurs but in the opposite direction.

Lithium-ion battery technology has enjoyed a lot of attention in recent years and provides the preferred portable battery for most electronic application devices in use today, however, lithium is not a cheap metal to source and is considered too expensive for use in large scale applications. By contrast, sodium is much more abundant than lithium and expectations are high that sodium-ion batteries will provide a cheaper and more durable way to store energy into the future, particularly for large scale applications such as storing energy on the electrical grid. Nevertheless, more work is needed to make sodium-ion batteries a commercial reality.

For any rechargeable battery, the energy which is available for practical use is a function of the depth of discharge (DoD) and voltage of each cell. In the case of conventional lithium-ion batteries, for example those which use cells that comprise a lithium cobalt oxide (LCO), a lithium nickel manganese cobalt oxide (NMC) or a lithium nickel cobalt aluminium oxide (NCA) cathode material, a carbon or silicon anode, a copper anode current collector and an aluminium-containing cathode current collector, problems can occur when such cells are either stored in a fully discharged state, or cycled down to 0 Volts or close to 0 Volts. For example, copper dissolution from the negative (anode) electrode current collector is liable to lead to a decrease in the discharge capacity of the cathode and the lithium-ion battery will suffer increasingly shortened cycle times. However, the real issue with cycling lithium-ion cells down to close to 0 Volts is that they are at risk of being unstable, liable to overheating and unpredictably catching fire. So far, attempts to eliminate copper dissolution by using aluminium in place of copper in the negative current collector have been unsuccessful as this leads to alloying reactions between the lithium and the aluminium in a fully discharged cell, and although there are alternative negative (anode) electrode materials that operate at a sufficiently high potential versus lithium for a lithium/aluminium alloy not to form, only a few such negative electrode materials are known to be capable of this, for example $Li_4Ti_5O_{12}$.

To mitigate these difficulties, the established practice for handling standard lithium-ion batteries is to require a state of charge of between around 90 and around 30% (20% for LFP, $LiFePO_4$ batteries), i.e. their depth of discharge (DoD) must be no more than around 70%-80%. Lithium-ion batteries are conditioned immediately following manufacture using at least two or three charge/discharge cycles followed by a final charge to at least around 40% stage-of-charge, and all storage conditions at or close to 0 Volts are avoided. However, as a result of these precautions, the energy remaining in a standard lithium-ion battery at a state of charge of around 30% (or around 20% for LFP) is unable to be accessed and is therefore wasted.

Sodium-ion batteries on the other hand, are extremely stable when fully discharged and when cycled down to 0 Volts and the present applicant has found that it is possible to access, and repeatedly access, substantially all (e.g. >95%) of the energy in a sodium-ion cell, even when it is at a very low state of charge (for example a S.O.C 0% to <30%) and without impacting the lifetime of the sodium-ion cell. However, the design of commercially viable sodium-ion batteries is currently hampered by the fact that many electrical systems used in common-place applications employ the narrow legacy voltage limits which were designed to keep the lead acid and lithium-ion cells within a voltage window which maximises cycle life and ensures battery safety. For example, a commercial, nominally 12V lead acid battery (Yuasa NPC24-12I Industrial VRLA, employing six cells in series) will only operate in a voltage window between 14.5V and 10.5V. Table 1 lists the published voltage limits for common cell chemistries.

TABLE 1

| Chemistry | Abbreviation | Nominal cell Voltage | Maximum Operating cell Voltage (Vmax) | Minimum Operating cell Voltage (Vmin) | Vmin/Vmax % |
|---|---|---|---|---|---|
| Lead Acid | PbA | 2 | 2.1 | 1.75 | 83.33% |
| Nickel Cadmium | NiCd | 1.2 | 1.4 | 1 | 71.43% |
| Nickel Metal Hydride | NiMH | 1.2 | 1.4 | 1 | 71.43% |
| Lithium Titanate Oxide | LTO/Li2TiO3 | 2.4 | 2.85 | 1.8 | 63.16% |
| Lithium Cobalt Oxide | LCO/LiCoO2 | 3.7 | 4.2 | 3 | 71.43% |
| Lithium Manganese Oxide | LMO/LiMn2O4 | 3.7 | 4.2 | 3 | 71.43% |
| Lithium Nickel Manganese Oxide | NMC/ LiNiMnCoO2 | 3.6 | 4.2 | 3 | 71.43% |
| Lithium Iron Phosphate | LFP/LiFePO4 | 3.2 | 3.65 | 2.5 | 68.49% |

TABLE 1-continued

| Chemistry | Abbreviation | Nominal cell Voltage | Maximum Operating cell Voltage (Vmax) | Minimum Operating cell Voltage (Vmin) | Vmin/Vmax % |
|---|---|---|---|---|---|
| Lithium Nickel Cobalt Aluminium Oxide | NCA/ LiNiCoAlO2 | 3.6 | 4.2 | 3 | 71.43% |
| Sodium Ion | Na Ion/Sodium Ion | 3.2 | 4.3 | 1 | 23.26% |

As a result of these voltage windows, electronic components, such as inverters and motors have also been designed to operate within these limits. It can be seen that apart from sodium-ion cells, all the other chemistries are only able to operate in a voltage range where the minimum voltage (Vmin) is >60% of cell Vmax. Only sodium-ion cells are able to operate in a voltage range where Vmin is <60% cell Vmax. Expressed another way, sodium-ion cells are distinctive in having much wider voltage ranges than other types of rechargeable cell and are thus much less compatible with existing electronic components.

The aim of the present invention, therefore, is to provide a sodium-ion battery pack which is designed to facilitate efficient and exhaustive access to the energy available from the one or more sodium-ion cells which are employed by the battery pack. Specifically, the aim of the present invention is to provide a sodium-ion battery pack which enables practical access to all, or at least substantially all, of the energy from sodium-ion cells, and thereby to increase the total energy available from the sodium-ion cells. A further aim is to enable such practical access of the energy from the sodium-ion cells when they are at low cell voltages, i.e. at voltages lower than the typical lower limit of electronic components. A still further aim is to provide a sodium-ion battery pack which is capable of controlling the battery output voltage so that it is aligned with the requirements of any external electronic components connected to the battery pack. Additionally, the aim of the present invention is to increase the usable specific energy of the sodium-ion cells within the sodium-ion battery pack (i.e to increase the usable energy per unit mass, J/Kg), and/or to increase the volumetric energy density of the sodium-ion battery pack or the sodium-ion cells, to the maximum achievable within a cost window. Moreover, the aim is to design a sodium-ion battery pack which will have no impact on any aspect of sodium-ion cell performance such as a safety, cycle life and rate performance.

The aim of the present invention is also to provide a method of delivering all, or at least substantially all, that is, preferably at least 90%, more preferably at least 93% and further preferably at least 95%, of the energy from a sodium-ion battery in which the sodium-ion battery and/or the one or more sodium-ion cells contained within it are operable at cell Vmin in the range >0 to <2.0 V. A further aim is to provide an electronic application device which is connected to a sodium-ion battery pack according to the present invention.

The term "operable" in this context, and as used in herein, means that the sodium-ion cells are capable of being operated between the cell Vmax and cell Vmin according to the present invention. Such cells are used in a battery pack according to the present invention. Contrast non-sodium-ion cell chemistries which, as discussed above, are not operable (i.e. are incapable of being operated) between the cell Vmax and cell Vmin according to the present invention.

As described below, the sodium-ion battery pack according to the present invention is designed to enable access to a much larger input voltage range than is available in traditional battery chemistry which thereby increases the amount of usable energy. In particular, the present invention provides an efficient and cost-effective means to convert the energy present at low voltages in sodium-ion cells into energy which is available for use and which would otherwise be wasted. Ideally, the sodium-ion battery pack of the present invention is designed using components which do not add any unnecessary mass to the battery pack.

In its broadest aspect, the present invention provides a sodium-ion battery pack comprising one or more sodium-ion cells and one or more voltage converters. Preferably, the sodium-ion battery pack comprises two or more sodium-ion cells.

The one or more sodium-ion cells are operable between a cell Vmin in the range >0.0 V to <2.0 V and a cell Vmax in the range >3.60 V to <4.30 V. As discussed above, the ability of sodium-ion cells to be operated (i.e. to be operable) within these cell Vmin and cell Vmax voltage ranges is an intrinsic characteristic of sodium-ion cells which is not shared by other cell chemistries.

Preferably, the one or more sodium-ion cells are operable between a cell Vmin in the range >0.0 V to ≤1.50 V, and ideally between cell Vmin in the range >0.0 V to ≤1.0 V. Preferably, the one or more sodium-ion cells have a cell Vmax in the range >3.70 V to ≤4.25 V, and ideally operable between cell Vmax in the range >3.70 V to ≤4.20 V.

In some embodiments, the one or more sodium-ion cells, preferably all of the one or more sodium-ion cells, are operable in a voltage range where cell Vmin is from >0% to 55% of cell Vmax, preferably from >0% to 50% of cell Vmax, and further preferably from >0% to 45% of cell Vmax. Again, as discussed above the ability of sodium-ion cells to be operable within these Vmin/Vmax percentages is an intrinsic characteristic of sodium-ion cells which is not shared by other cell chemistries.

The two or more cells have the same cell voltage, preferably, nominal cell voltage, and all are of the same electrochemical design. The term "same cell voltage profile" or "same cell nominal voltage profile" as used herein means the same voltage versus capacity relationship.

Furthermore, a "nominal" (or "named") cell voltage, as indicated in Table 1, and as used herein, is intended to mean the cell voltage value that has been assigned (nominated) to a cell or battery, for instance by a manufacturer, and it is based on the electrochemistry of the cell.

The actual measured voltage of a cell or battery will decrease as the cell or battery discharges. Furthermore, it will be appreciated that, for instance during manufacture, or during the life span of the cell or battery, variation from this nominal cell voltage value may occur. Variation may be most prominent during aging of the cell or battery in use. However, as will be understood by those skilled in the art, the nominal cell voltage assigned to a cell or battery will remain constant, that is, the assigned nominal voltage will not change even when the actual measured voltage decreases as discussed above.

The two or more sodium-ion cells are also typically of the same electrochemical design. By "same electrochemical design" we mean that they share a combination of the same cell construction and the same cell chemistry. In particular, the electrode/electrolyte chemistry, power density (per unit mass or per unit volume) and energy density (per unit mass or unit per volume) of the two or more sodium-ion cells is therefore essentially the same when initially installed in the battery.

As a result of all of the two or more sodium-ion cells having the same electrochemical design and same nominal voltage, they will operate in unison within the sodium-ion battery pack, that is, the two or more sodium-ion cells will initially all behave in an essentially similar way. The benefit of this arrangement is that the lifetime of the sodium-ion battery pack will be much greater.

As used herein, the one or more voltage converters within the sodium-ion battery pack of the present invention provide a means of aligning (preferably boosting) the output voltage (also known as the terminal voltage) of the sodium-ion battery pack comprising sodium-ion cells to a level acceptable to any electronic components external to a sodium-ion battery pack. This is particularly useful for sodium-ion cells which comprise a hard carbon anode where complete discharge of the cell only occurs over a wide voltage window.

In some embodiments the present invention uses two or more voltage converters. These may be the same, similar or completely different from each other, for example, in terms of their physical and/or performance characteristics, and/or their type, and/or their mode of operation.

In some embodiments each of the one or more voltage converters is separately connected to an individual cell. Additionally, or alternatively, each of the one or more voltage converters may be connected to more than one cell. The one or more voltage converters may be connected inside and/or outside of the sodium-ion battery comprising the one or more sodium-ion cells.

If the energy within a cell at a low voltage is not converted to a higher voltage, it will be unavailable for use and this will therefore adversely impact the effective specific energy of the cell. The energy remaining (and therefore wasted) in a sodium-ion cell at low voltage (<60-70% cell Vmax) can amount to as much as 14% of the total energy within the cell.

Most ideally therefore, the one or more voltage converters are provided to increase the terminal voltage of the sodium-ion battery pack to >60% (preferably >70%) battery Vmax when the voltage measured across those one or more sodium-ion cells of the sodium-ion pack that are connected in series is ≤60% (preferably ≤70%) battery Vmax.

The "battery Vmax" is the cell Vmax multiplied by the number of cells in series in the pack and relates to the combined voltage of such cells in the absence of the one or more voltage converters. This is therefore the maximum operating voltage of the battery in the absence of the one or more voltage converters.

The "cell Vmax" as explained with reference to Table 1, is the maximum operating voltage of the cell itself, in the absence of the one or more voltage converters.

The terminal voltage of the sodium-ion battery pack corresponds to voltage measured across those of the one or more sodium-ion cells in the sodium-ion battery pack that are connected in series.

Preferably, the efficiency of the one or more voltage converters is such that the energy gained on conversion is greater than the energy lost in the one or more voltage converters through resistive heating and switching, i.e. the energy efficiency of the voltage conversion must be high. Furthermore, the mass of the one or more voltage converters is preferably such that the extra contribution to the specific energy from the "up-conversion" is not out-weighed by the impact of the mass of the one or more voltage converters. A similar argument applies to the combined volume of the pack and the one or more voltage converters.

A preferred voltage converter is a DC/DC Converter which is a type of electric power converter that generally comprises an electronic circuit or electrochemical device that converts a source of direct current at one voltage level to another voltage level. Particularly preferably, the DC/DC converter is a bi-directional DC/DC converter which allows power to flow in both forward and reverse directions. Typical DC/DC converters include Boost Converters and Buck/Boost Converters, although the present invention is not limited to these two types. In general terms, Boost Converters increase the voltage from a DC source, whereas Buck/Boost Converters will increase and decrease the output voltage.

Depending upon voltage converter circuitry, the one or more voltage converters (e.g. a DC/DC Converter) will either lead to a fixed output voltage or will replicate an existing or known voltage profile. The one or more voltage converters, particularly when at least one is a DC/DC converter, can either be a piece of stand-alone circuitry (as used the examples below), or it can be incorporated into or linked to another component such as a battery management system (BMS). Therefore, in some embodiments, the present invention further comprises a battery management system (BMS).

The term "battery management system" (BMS) in this context and as used herein, also includes management systems for energy storage devices in general. A battery management system is an electronic system that manages a rechargeable battery (cell or battery or energy storage device) by, for example, protecting it from operating outside its Safe Operating Area, by monitoring the state of the battery (energy storage device), by calculating secondary data and reporting that data, and using it to control the performance of the battery (energy storage device), for example by re-balancing the charges within each of its cells. Since the sodium-ion cells used in the sodium-ion battery pack of the present invention may be safely discharged down to at least 0 volts without any detriment to the charge/discharge performance of the cells, there is no need for an associated battery management system to be concerned with monitoring the lower limit of the Safe Operating Area, or to perform measures to even-out the charge at these low levels, however it is nevertheless important to manage sodium ion cells at the top of charge. A BMS will therefore typically monitor the individual cell voltage, the current and temperature and control battery safety systems, and preferably will employ cell balancing.

Advantageously, the one or more voltage converters will not add unnecessary mass to the at least one sodium-ion cell or battery pack, thus ensuring that the useable specific energy of the sodium-ion battery pack is higher than the usable specific energy of the at least one sodium-ion cell alone. The present invention preferably employs one or more voltage converters which are light in weight, and which are highly efficient with only a low amount of energy being lost through resistive heating and switching.

Although DC/DC Converters are known for use in combination with lithium-ion cells, and also for use within electronic application devices, to ensure that the lithium-ion cell output voltage matches the voltage requirements of a specific application/device, there is no prior disclosure to date of a battery pack comprising one or more sodium-ion cells and one or more voltage converters (preferably at least one of which being a DC/DC converter) to provide a means of aligning the sodium-ion battery pack output voltage to a level acceptable to the electronic components (e.g. an electronic application device) external to a sodium-ion battery pack. Moreover, there is no prior art disclosure to date which describes that particular designs of a sodium-ion battery pack are able to provide an increase in the total energy available from at least one sodium-ion cell employed by the battery pack; nor any disclosure which describes that particular designs of a sodium-ion battery pack are able to provide an increase in the specific energy available from the sodium-ion battery pack, nor any disclosure of a particular design of sodium-ion battery pack which can achieve an increased volumetric energy density.

Therefore, the present invention provides (including a use thereof) a sodium-ion battery pack comprising one or more sodium-ion cells and one or more voltage converters (at least one of which is preferably a DC/DC converter as described above), wherein the deliverable specific energy of the sodium-ion battery pack satisfies the following condition:

$$\frac{\text{(Difference in Energy between battery } V_{max} \text{ and } 0V \text{) multiplied by (Efficiency of the one or more voltage converters)}}{\left(\begin{array}{l}\text{Mass of the one or more sodium-ion cells} + \\ \text{Mass of the one or more voltage converters}\end{array}\right)} > \frac{\text{(Difference in Energy between battery } V \text{max and } 60\text{-}70\% \text{ battery } V_{max})}{\text{Mass of the one or more sodium-ion cells;}}$$

wherein battery $V_{max}$ is determined as the maximum output voltage of the sodium-ion battery pack comprising the one or more sodium-ion cells in the absence of the one or more voltage converters.

Preferably, the deliverable specific energy of the sodium-ion battery pack satisfies the following condition:

$$\frac{\text{(Difference in Energy between battery } V_{max} \text{ and } 0V \text{) multiplied by (Efficiency of the one or more voltage converters)}}{\left(\begin{array}{l}\text{Mass of the one or more sodium-ion cells} + \\ \text{Mass of the one or more voltage converters}\end{array}\right)} > \frac{\text{(Difference in Energy between battery } V \text{max and } 60\text{-}65\% \text{ battery } V_{max})}{\text{Mass of the one or more sodium-ion cells;}}$$

wherein battery $V_{max}$ is determined as the maximum output voltage of the sodium-ion battery pack comprising the one or more sodium-ion cells in the absence of the one or more voltage converters.

For the avoidance of doubt, the maximum output voltage of the sodium-ion battery pack comprising the one or more sodium-ion cells in the absence of the one or more voltage converters, battery $V_{max}$, as used herein will be defined as the initial design maximum voltage of the sodium-ion battery pack. The fact that such an initial design maximum voltage typically declines over the cycle life of the pack is specifically ignored in the Applicant's definition of battery $V_{max}$.

In another embodiment, the present invention provides (including a use thereof) a sodium-ion battery pack comprising one or more sodium-ion cells and one or more voltage converters (preferably at least one of which is a DC/DC converter as described above), wherein the volumetric energy density satisfies the following condition:

$$\frac{\text{(Difference in Energy between battery } V_{max} \text{ and } 0V \text{) multiplied by (Efficiency of the one or more voltage converters)}}{\left(\begin{array}{l}\text{Volume of the one or more sodium-ion cell} + \\ \text{Volume of the one or more voltage converters}\end{array}\right)} > \frac{\text{(Difference in Energy between battery } V_{max} \text{ and } 60\text{-}65\% \text{ battery } V_{max})}{\text{Volume of the one or more sodium-ion cells;}}$$

wherein battery $V_{max}$ is determined as the maximum output voltage of the sodium-ion battery pack comprising the one or more sodium-ion cells in the absence of the one or more voltage converters.

Preferably, the volumetric energy density satisfies the following condition:

$$\frac{\text{(Difference in Energy between battery } V_{max} \text{ and } 0V \text{) multiplied by (Efficiency of the one or more voltage converters)}}{\left(\begin{array}{l}\text{Volume of the one or more sodium-ion cell} + \\ \text{Volume of the one or more voltage converters}\end{array}\right)} > \frac{\text{(Difference in Energy between battery } V_{max} \text{ and } 60\text{-}65\% \text{ battery } V_{max})}{\text{Volume of the one or more sodium-ion cells;}}$$

wherein battery $V_{max}$ is determined as the maximum output voltage of the sodium-ion battery pack comprising the one or more sodium-ion cells in the absence of the one or more voltage converters.

In a further embodiment, the present invention provides the use of one or more voltage converters (preferably a DC/DC converter as described above) in combination with one or more sodium-ion cells to produce a sodium-ion battery pack which has a deliverable specific energy or a deliverable volumetric energy density at least 3% (preferably at least 5%) higher than the deliverable specific energy or a deliverable volumetric energy density as the case may be of the sodium-ion battery pack comprising the one or more sodium-ion cells in the absence of the one or more voltage converters.

In another further embodiment, the present invention provides the use of a sodium-ion battery pack according to the present invention to increase the terminal voltage of the sodium-ion battery pack to >60% (preferably >70%) battery Vmax when the voltage measured across those of the one or more sodium-ion cells of the sodium-ion battery pack that are connected in series is ≤60% (preferably ≤70%) battery Vmax.

As explained above, the "battery Vmax" is the cell Vmax multiplied by the number of cells in series in the pack and relates to the combined voltage of such cells.

Additionally or alternatively, the one or more voltage converters are provided to increase the terminal voltage of the sodium-ion battery pack to >60% (preferably >70%) battery Vmax when a cell voltage of the one or more sodium-ion cells of the sodium-ion pack is ≤60% (preferably ≤70%) cell Vmax. As also explained above, the "cell Vmax" is the maximum operating voltage of the cell itself.

To summarise the above, in another further embodiment, the present invention provides the use of the sodium-ion battery pack as described above to increase the terminal voltage of the sodium-ion battery pack to >60% battery Vmax, when the voltage measured across those of the one or more sodium-ion cells of the sodium-ion battery pack that are connected in series is ≤60% Vmax. Vmax in this latter instance is to be interpreted as battery Vmax and/or cell Vmax.

In another preferred embodiment, the present invention provides a method of accessing the energy, preferably specific energy, available from a battery comprising one or more sodium-ion cells, comprising the steps of:

a) providing a sodium-ion battery pack comprising one or more voltage converters and one or more sodium-ion cells, wherein the one or more sodium-ion cells are operable between a cell Vmin in the range >0.0 to <2.0 V and a cell Vmax in the range >3.60 V to <4.30 V; and further wherein when the sodium-ion battery pack comprises two or more sodium-ion cells, all of the two or more sodium-ion cells have the same cell nominal voltage profile and the same electrochemical design;

b) associating or integrating the battery pack with an electronic application device; and c) directly or indirectly operating at least one of the one or more voltage converters to increase the output voltage of the sodium-ion battery pack to more than 60% of battery $V_{max}$, preferably more than 70% of battery $V_{max}$;

wherein battery $V_{max}$ is determined as the maximum output voltage of the sodium-ion battery pack comprising the one or more sodium-ion cells in the absence of the one or more voltage converters.

In this method, the one or more voltage converters may be operated directly or indirectly.

Indirect operation, for example, may use a signal generated (for example by the BMS, or other computer software) in response to the power requirements of the application device. Additionally, the one or more voltage converters may be operated continuously or discontinuously, throughout some of, or all of, or outside (e.g. below the minimum operating voltage) of the operating voltage range of the electronic application device and depending upon the output voltage profile required.

Preferably, the one or more voltage converters are operated when the output voltage of the one or more sodium-ion cells is at or below 70% of $V_{max}$. Highly preferably, the one or more voltage converters are operated when the output voltage of the one or more sodium-ion cells is at or below 60% of $V_{max}$.

It will be familiar to those knowledgeable in the art that the one or more voltage converters (preferably at least one of which is a DC/DC converter) have a response time and since some of the voltage will be lost in the one or more converters as the converters consume energy, then for the one or more converters to uplift reliably the voltage at less than 60% of Vmax for example in a discharge cycle, it is beneficial for at least one of the one or more converters to be switched on slightly before the desired voltage is attained, for example slightly before the voltage reaches 60% of Vmax.

In another preferred embodiment, the present invention provides the use of a sodium-ion battery pack according to the present invention to increase the available and/or deliverable specific-energy and/or deliverable volumetric energy density of a sodium-ion pack which comprises one or more sodium-ion cells in the absence of one or more voltage converters, by at least 3% (preferably at least 5%).

Preferably, the one or more voltage converters (preferably including at least one DC-DC converter) are capable of converting efficiently, cost effectively and without unnecessary mass, all, or substantially all, (preferably at least 90%, highly preferably at least 95%) of the energy available at low voltages (e.g. <3.5 to <2.5 Volts) into energy available within a pre-determined narrow and higher voltage window (e.g. 4.2V to 3.5V or 4.2 to 2.5V).

Advantageously, the present invention will achieve conversion of 94-95% of the cell energy available at a 1.5 V minimum cell voltage into energy available within a 2.4 V-4.2 V voltage window. The present invention is ideally suitable for use in static storage and mobile systems.

In a further preferred embodiment, the present invention provides a sodium-ion battery pack which is highly suitable for use in connection with electronic application devices applicable for static or stationary applications (such as in large-scale energy storage), for back-up power supplies and for portable (mobile) applications (such as mobile telephones, computers, tablets etc. and in starting, lighting and ignition (SLI) batteries and motor drives for electric vehicles), particularly when the battery pack output voltage for such electronic application devices is in a low voltage (e.g. ≤70%, preferably ≤60%, of battery Vmax). The present invention, therefore, provides an electronic application device which is integrated or associated with a sodium-ion battery pack according to the present invention.

A "sodium-ion cell" as used herein is to be defined as meaning any secondary sodium-ion electrochemical cell and suitable examples include (but the invention is not limited to these examples) non-aqueous sodium-ion cells, aqueous sodium-ion cells, sodium-air cells and sodium-oxygen cells. A plurality of such electrochemical cells may be utilised in any small- or large-scale energy storage devices including but not limited to batteries, battery modules, electrochemical devices and electrochromic devices. The term "sodium-ion battery pack" according to the present invention includes any such small or large-scale energy storage device associated, integrated or used in combination with one or more voltage converters, as described above. Typically, the pack will comprise a container and advantageously safety systems and a battery management system.

Typically, the sodium-ion cells used in the battery pack of the present invention have i) a negative electrode comprising a negative electrode material and a negative electrode current collector, and ii) a positive electrode comprising a positive electrode material and a positive electrode current collector. Suitable negative electrode materials include amorphous carbon, hard carbon, silicon and any other material, for example alloying metals such as tin, germanium or antimony, whose structure is adapted to allow the insertion/removal of sodium ions during charge/discharge. Advantageously the negative and positive current collectors comprise one or more conductive materials which are stable at low voltages (i.e within the preferred cell voltage ranges described above), and/or under conditions of low state of charge (for example less than 20% state of charge), and which do not dissolve or alloy with sodium. Preferably, the one or more conductive materials do not alloy and/or otherwise react with sodium and may be in pure form, impure form, as an alloy or as a mixture, either alone or in combination with varying amounts of one or more other elements. Further preferably at least one of the one or more conductive materials comprises one or more metals selected from copper, aluminium and titanium. Ideally, one or both of the current collectors comprise aluminium, either in pure form, impure form, as an alloy or as a mixture, either alone or in combination with varying amounts of one or more other elements. Low grade aluminium, for example from impure or household-grade sources, is especially preferred and this achieves obvious important commercial advantages. A carbon coated negative electrode current collector is also useful as this produces benefits such as better adhesion between the active negative electrode material and the negative electrode current collector, which in turn, leads to lower contact resistance. Current collectors that comprise a carbon-coating are also found to improve the rate performance, and this enables current to be quickly charged/discharged. Similar advantages are obtained when the sodium-ion cell includes a positive electrode current collector which comprises a carbon coating. A sodium-ion cell that includes carbon coated positive and negative current collectors is especially electrically efficient.

The positive electrode (cathode) materials used in the sodium-ion cells of the present invention include any materials which allow sodium ions to intercalate and de-intercalate (move into and out of their lattice or layered structure) during charging and discharging. Suitable examples include metal sulphide compounds, such as $TiS_2$, metal oxide compounds, phosphate containing compounds, polyanion containing compounds, Prussian blue analogues and nickelate or non-nickelate compounds of the general formula:

$$A_{1\pm\delta}M_V^1 M_W^2 M_X^3 M_Y^4 M_Z^5 O_{2-c}$$

wherein

A is one or more alkali metals selected from sodium, potassium and lithium;

$M^1$ comprises one or more redox active metals in oxidation state +2, preferably one or more redox active metals in oxidation state +2 selected from nickel, copper, cobalt and manganese;

$M^2$ comprises a metal in oxidation state greater than 0 to less than or equal to +4;

$M^3$ comprises a metal in oxidation state +2;

$M^4$ comprises a metal in oxidation state greater than 0 to less than or equal to +4;

$M^5$ comprises a metal in oxidation state +3;

wherein $0 \leq \delta \leq 1$;

V is >0;

W is $\geq 0$;

X is $\geq 0$;

Y is $\geq 0$;

at least one of W and Y is >0

Z is $\geq 0$;

C is in the range $0 \leq c < 2$ wherein V, W, X, Y, Z and C are chosen to maintain electrochemical neutrality.

Ideally, metal $M^2$ comprises one or more transition metals, and is preferably selected from manganese, titanium and zirconium; $M^3$ is preferably one or more selected from magnesium, calcium, copper, tin, zinc and cobalt; $M^4$ comprises one or more transition metals, preferably selected from manganese, titanium and zirconium; and $M^5$ is preferably one or more selected from aluminium, iron, cobalt, tin, molybdenum, chromium, vanadium, scandium and yttrium. A cathode active material with any crystalline structure may be used, and preferably the structure will be O3 or P2 or a derivative thereof, but, specifically, it is also possible that the cathode material will comprise a mixture of phases, i.e. it will have a non-uniform structure composed of several different crystalline forms. Layered metal oxide cathode materials are especially preferred.

BRIEF DESCRIPTION OF THE DRAWINGS

The present invention will now be described with reference to the following figures in which.

DETAILED DESCRIPTION

In the following experiments, the battery packs according to the present invention employ one of two types of Buck/Boost DC/DC Converters, namely either a MeanWell SD-1000L-48 converter available from Mean Well Enterprises Co. Ltd., or a converter available from Vicor Corporation. These converters were chosen for their ready availability and not for their particular performance and/or physical characteristics. It will be appreciated that any suitable voltage converter having appropriate mass, efficiency, volume and voltage characteristics may be used in a sodium-ion battery pack according to the present invention. For completeness, the MeanWell SD-1000L-48 converter is a wide input voltage buck/boost converter with an input voltage range of, 19V-72V, and has a mass of 1.675 kg. The dimensions of this converter are 295 mm×125 mm×41 mm.

The converter available from Vicor Corporation has an input window of 16V-50V, and a weight of 255 g. The dimensions of this converter are 85.93 mm×35.50 mm×9.4 mm.

General Experimental Method

Figure 2:
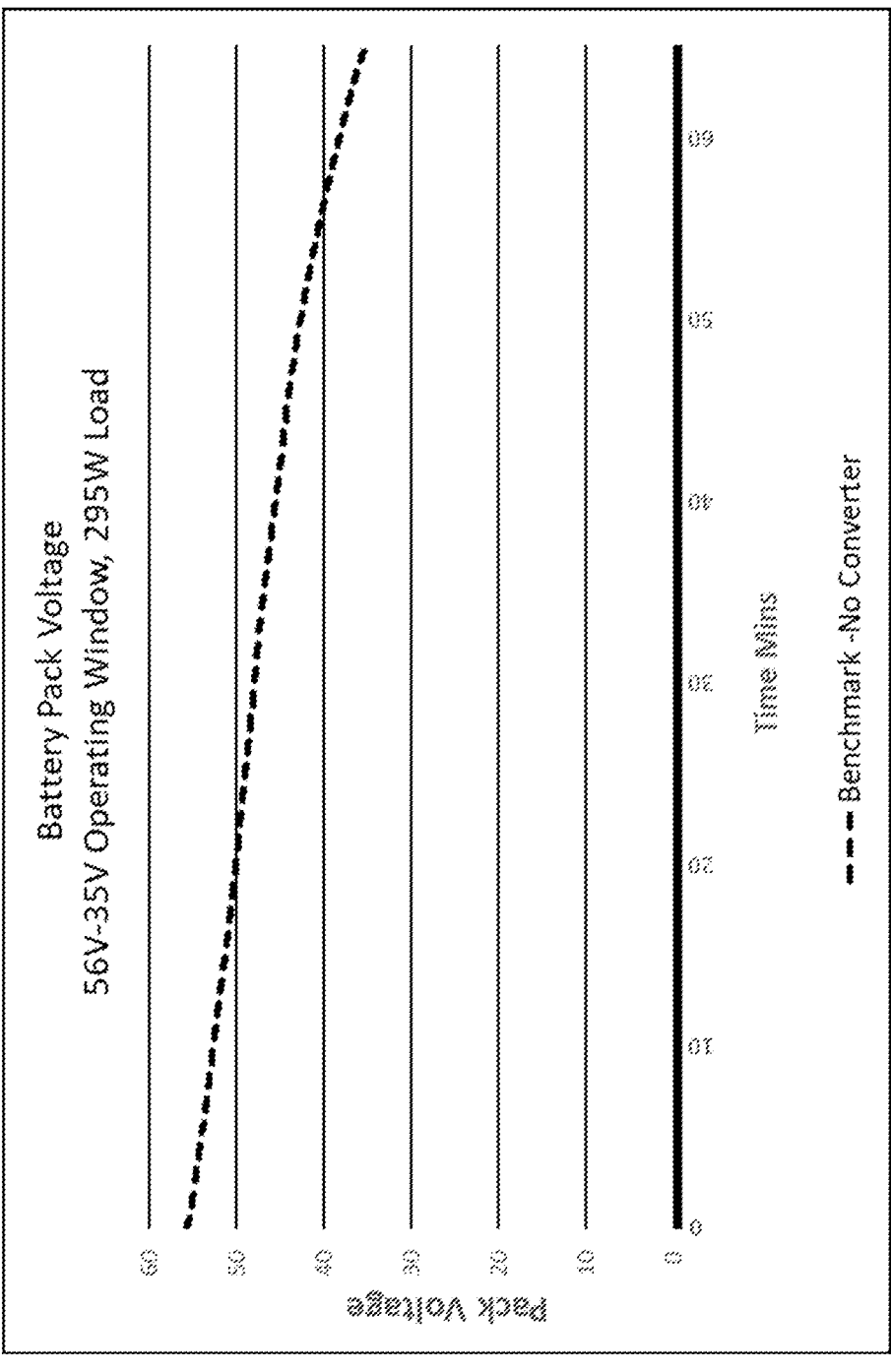
FIG. 2 shows the discharge voltage profile for the sodium-ion battery (with a voltage converter) connected to a 295 W load and discharged within a 56 V-35 V operating window, according to Reference Experiment 1.
Figure 4:
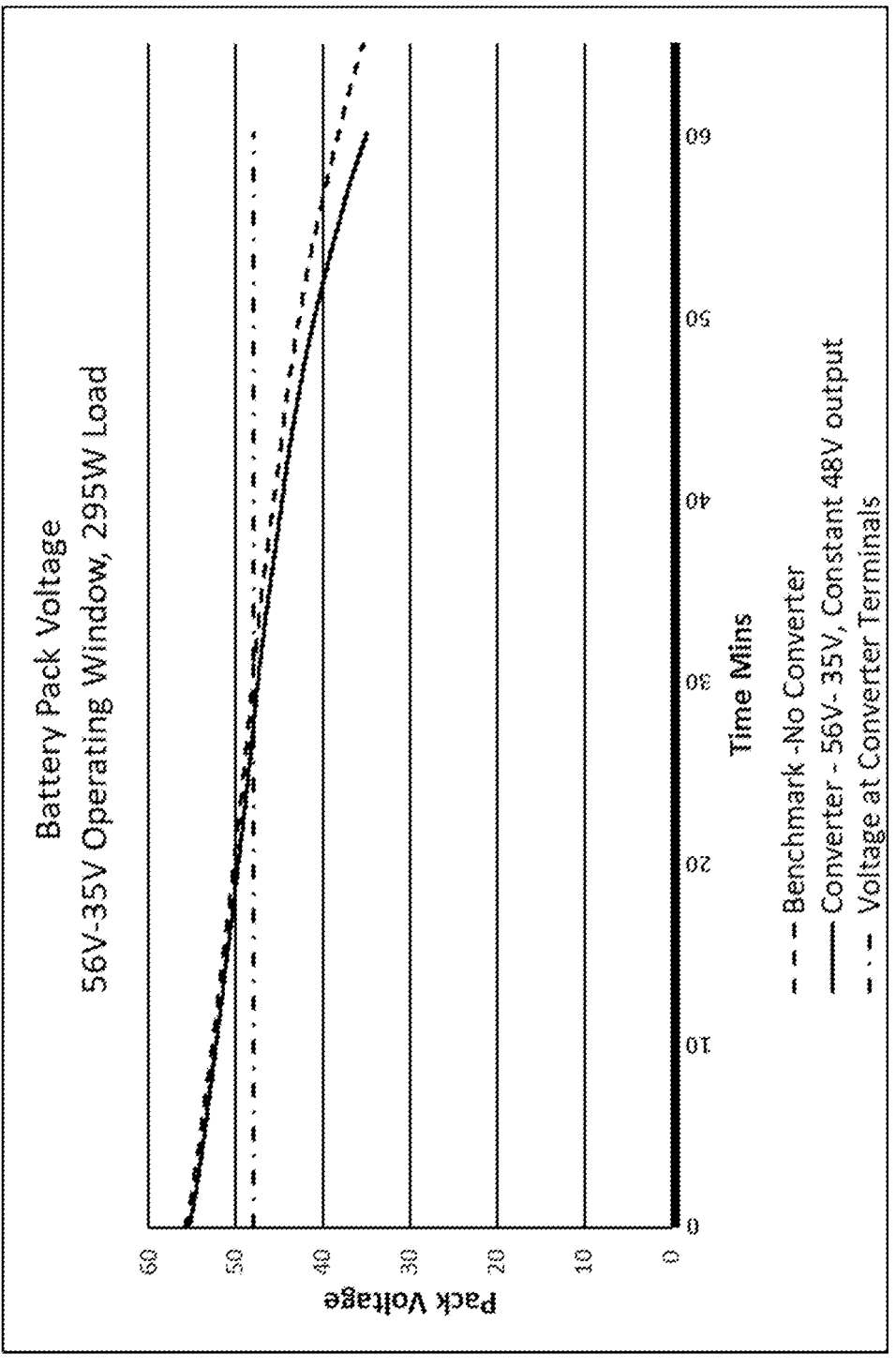
FIG. 4 shows the discharge profile for a Na-ion battery pack according to the present invention (with a voltage converter), connected to a 295 W load and discharged within in a 56 V-35 V operating window, according to Experiment 2. The output voltage of the battery pack in this case is a constant 48V. Also shown is the voltage profile from Reference Experiment 1 (without a voltage converter) for comparison.
Figure 6:
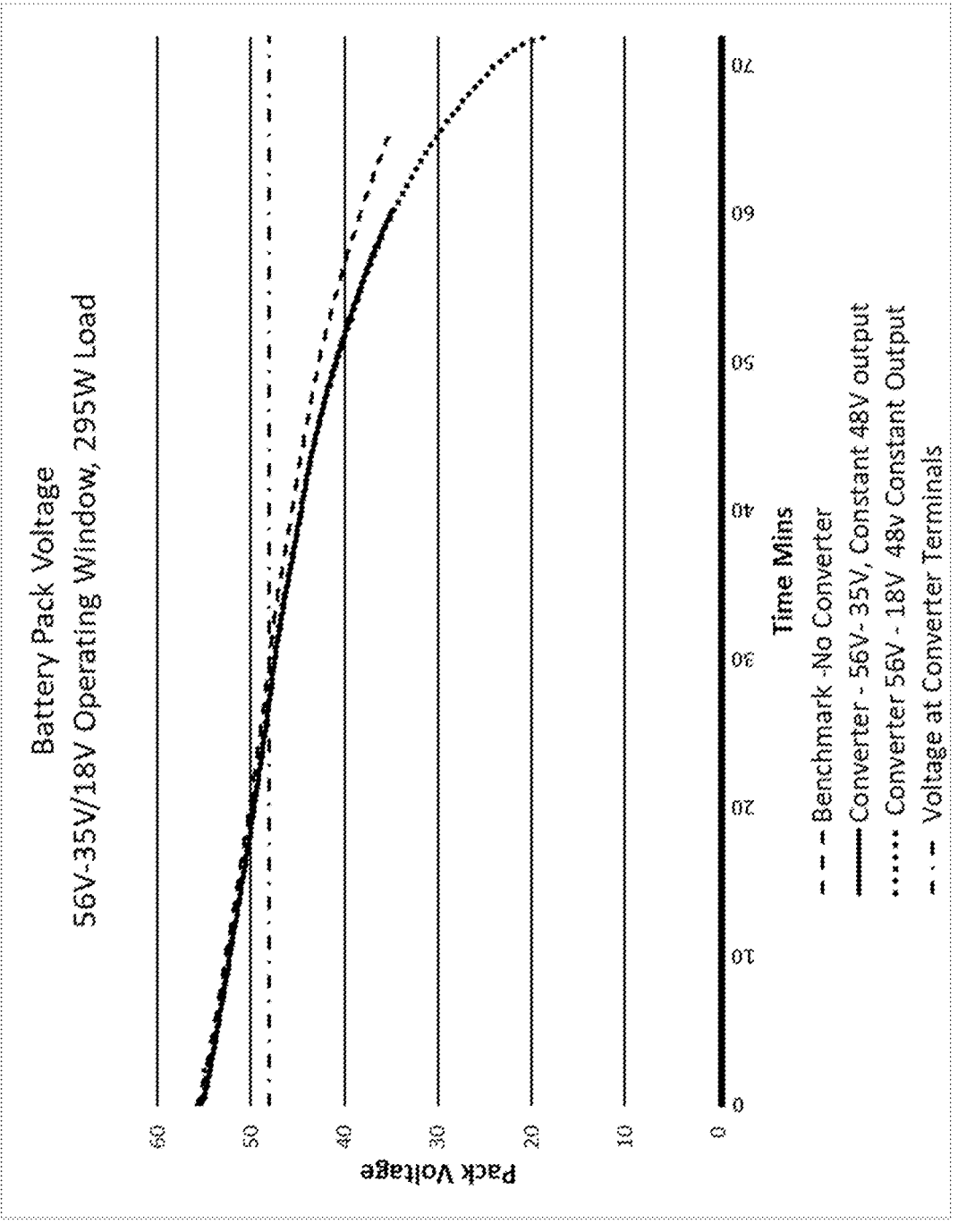
FIG. 6 shows the discharge profile for a Na-ion battery pack according to the present invention (with a voltage converter) connected to a 295 W load and discharged within in a 56 V-18 V operating window, according to Experiment 3. The output voltage of the battery pack in this case is a constant 48V. Also shown is the voltage profile from Reference Experiment 1 and Experiment 2 for comparison.

A 300 Wh Sodium Ion battery pack comprising 14 sodium-ion cells in series together with safety systems, BMS etc. was chosen as a test vehicle. The cells in this pack all have the same cell nominal voltage profile and the same electrochemical design meaning they will initially all behave in an essentially similar way. The pack was charged to 56V and then discharged through an electronic load of 295 W. The pack fusing and wiring were designed to take maximum current of 25 amps. The voltage of the pack was measured and recorded during the discharge using the data stream from the BMS, and the results are presented in FIGS. 2, 4 and 6. The total energy output was also measured. All the data collected for each experiment is presented in Table 2 below.

Figure 1:
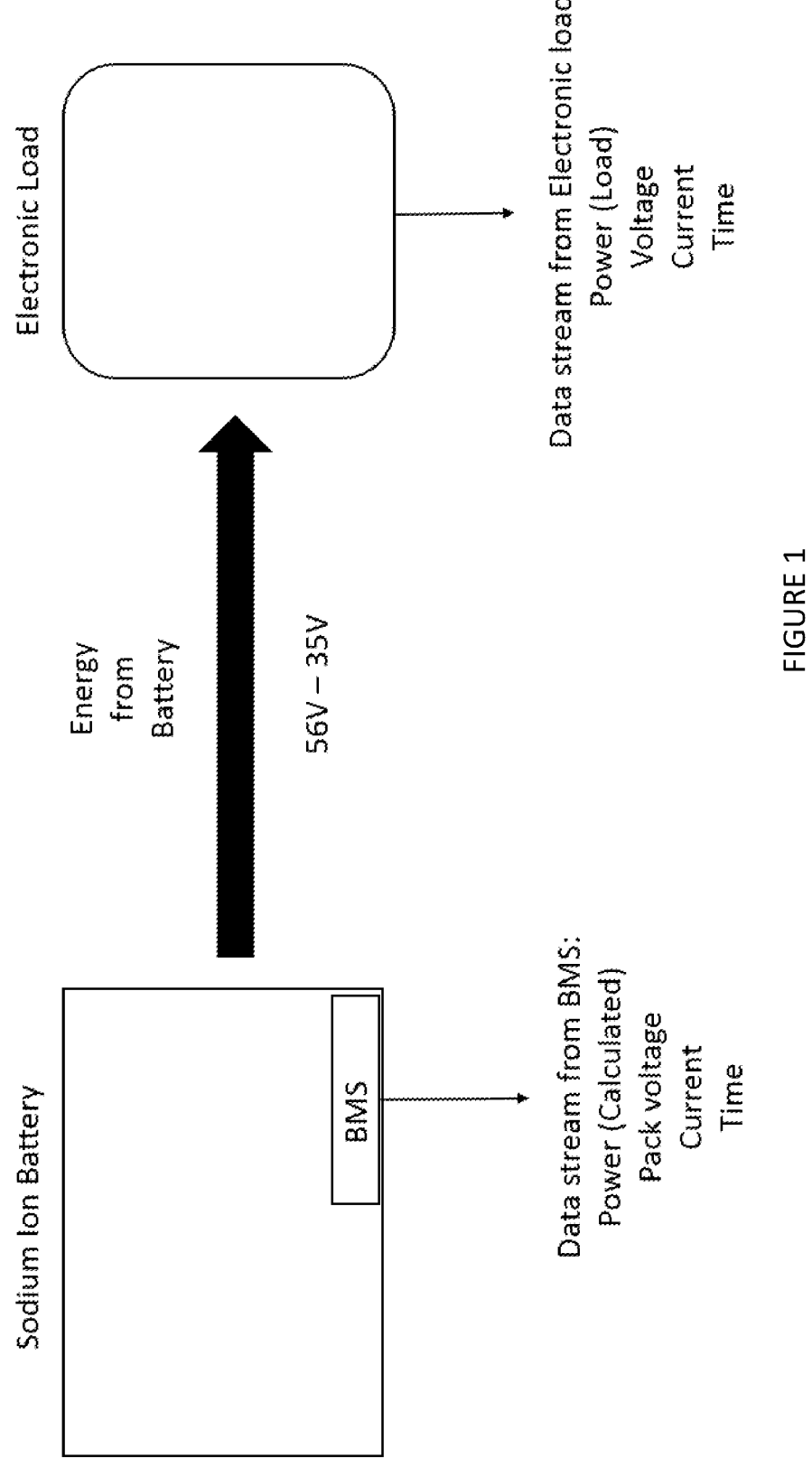
FIG. 1 is a schematic representation of the sodium-ion battery (without a voltage converter) used in Reference Experiment 1, the battery being used to power the load directly.

Reference Experiment 1—Discharge of the Pack
without a DC/DC Converter, to a Lower Pack
Voltage Limit of 35V A 14S 1P 300 Wh Sodium Ion battery pack designed, as depicted in FIG. 1, to discharge from 56V to 35V was connected directly to an electronic load of 295 W. The discharge voltage over time was measured and the results are presented in FIG. 2. This experiment (without a DC/DC converter) provides a reference or benchmark against which the results for Experiments 2 and 3 described below are compared. It will be noted that in these experiments the electronic loads experience a voltage drop as the battery pack discharges and the load pulls an increasing current to maintain a constant power output.

As presented in Table 2 below, the total output energy for reference Experiment 1, that is the energy available for use by the electronic load, is 322 Wh.

Figure 3:
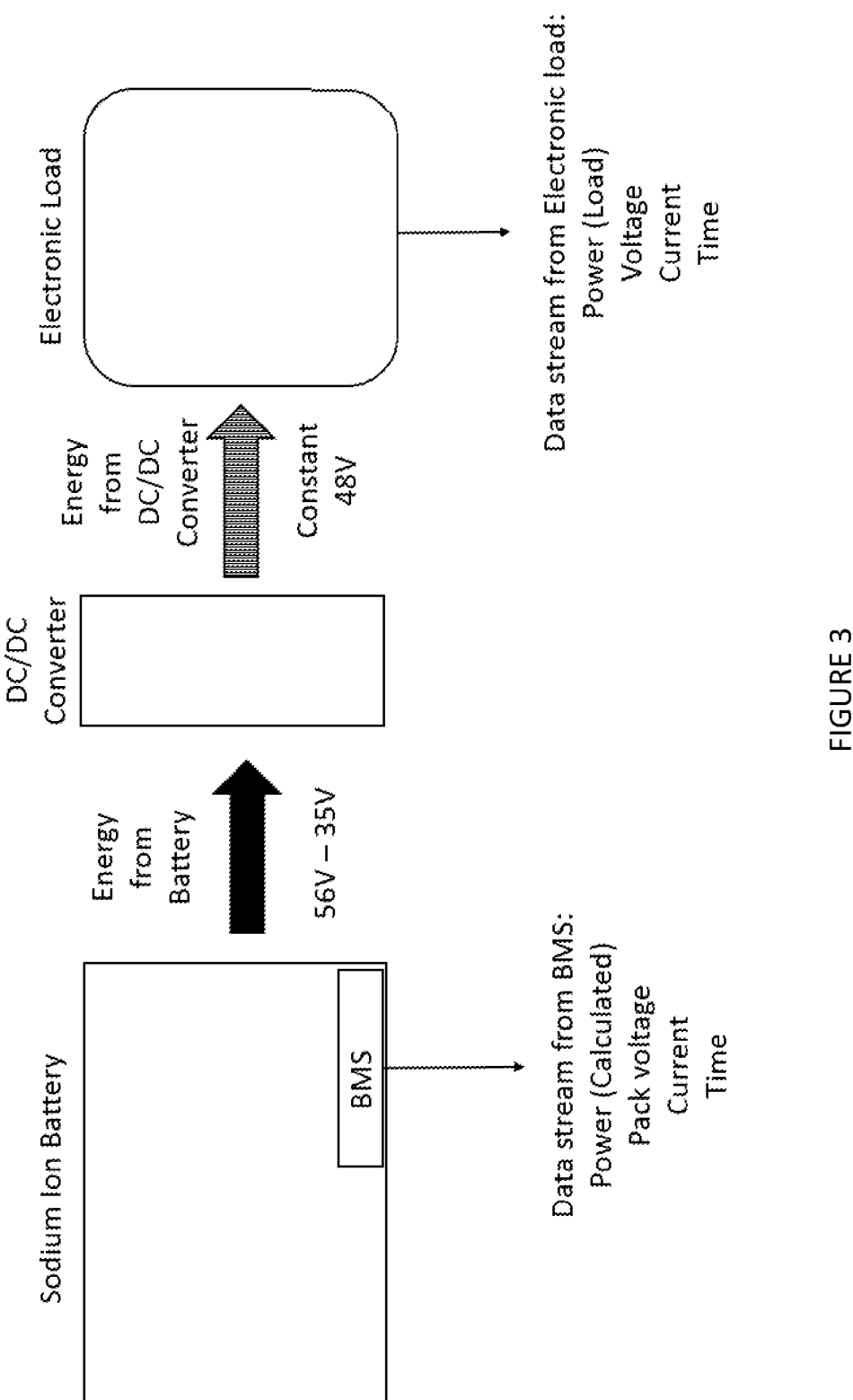
FIG. 3 is a schematic representation of the sodium-ion battery pack according to the present invention, as used in Experiment 2. This battery pack employed a DC/DC Converter when the battery pack is run between 56V and 35V, and the results highlight the losses in the system due to DC/DC Converter switching and heating.

Experiment 2—Discharge of the Pack Through a
DC/DC Converter to a Lower Pack Voltage Limit
of 35V This test was the same as Experiment 1 except that a MeanWell SD-1000L-48 DC/DC Converter giving a constant 48V output was introduced between the pack and the load. See FIG. 3 for a schematic representation of the sodium-ion battery pack designed for testing in Experiment 2. The battery pack was charged to 56V, then discharged to 35V. The battery voltage profile was measured over time, and the results are presented in FIG. 4 together with the voltage discharge curve for the Reference Experiment 1. It can be seen from FIG. 4 that there is an energy loss caused by using the DC/DC converter over the same voltage window. In this case, the battery pack energy input to the DC/DC converter was 322 Wh, and the total output energy was 297.5 Wh. From these results, we can see that the energy efficiency of the DC/DC converter over this voltage window is 92.38%.

Note: In this test, the electronic load will see a constant 48 Volts throughout the discharge and will pull a constant current from the DC/DC Converter.

Figure 5:
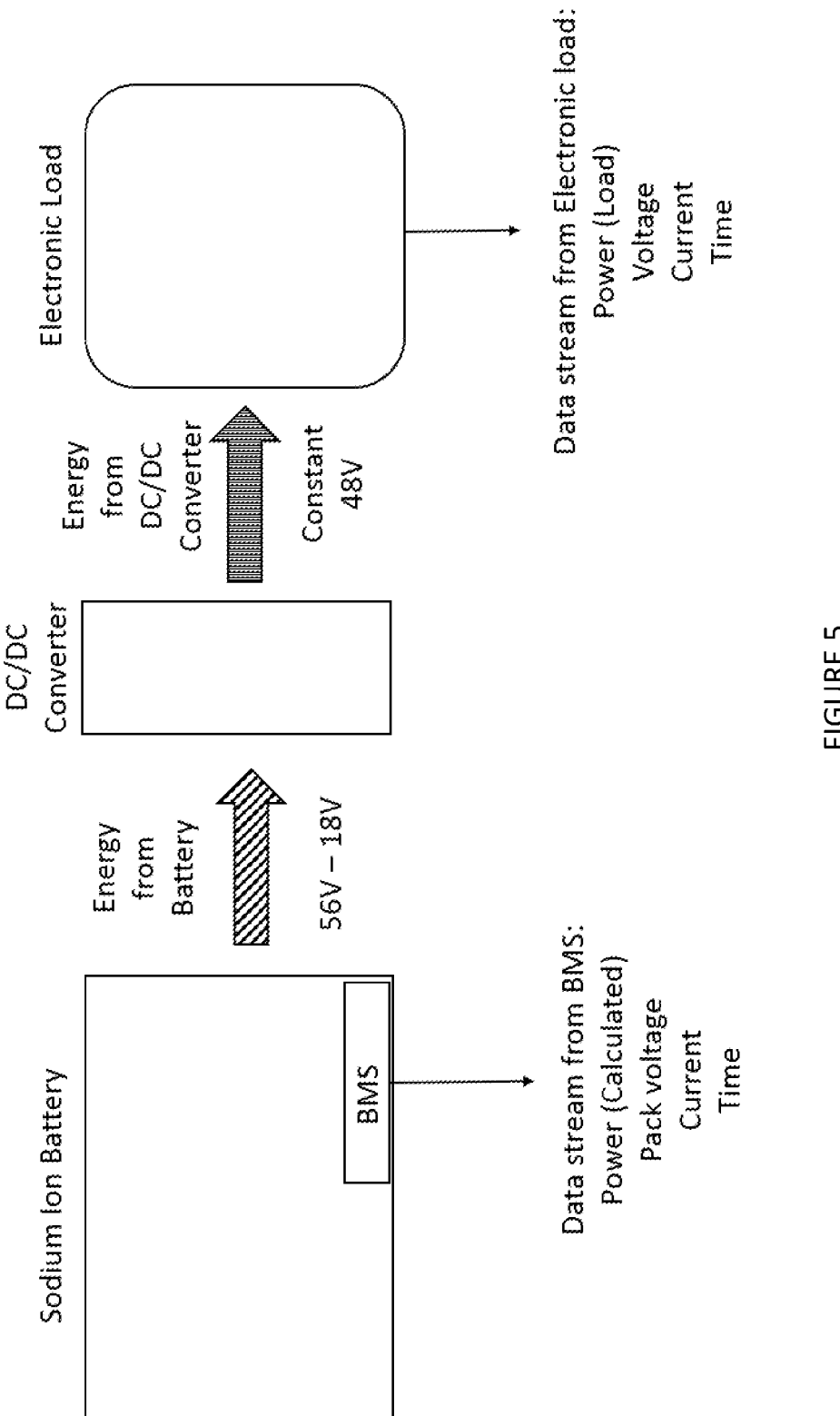
FIG. 5 a schematic representation of the sodium-ion battery pack according to the present invention, as used in Experiment 3.

Experiment 3—Discharge with a DC/DC Converter
with the Lower Pack Voltage Limit Set to 18V The test setup was the same as in Experiment 2 except that the lower pack voltage limit was now set to 18V, see the schematic representation shown in FIG. 5. The battery pack was charged to 56V and then discharged to 18V. The battery voltage profile was measured over time and the results are presented in FIG. 6. Also shown is the benchmark discharge voltage curve from Reference Experiment 1 (no converter), and also the discharge voltage curve from Experiment 2, with a voltage cut-off at 35V. The increase in electronic load runtime over Experiments 1 & 2 can be seen in FIG. 6, and as the load was constant power, the extra energy is a function of this additional runtime.

In this Experiment 3, the battery pack energy input to the DC/DC converter was 390.55 Wh, and the Total Output Energy available to the electronic load was 353.4 Wh. Relative to Reference Experiment 1, the use of this DC/DC converter has resulted in a 9.75% increase in available energy.

Over this voltage window the energy efficiency of the DC/DC Converter was 90.49%.

Note: In this test, the electronic load will see a constant 48 Volts throughout the discharge and will pull a constant current from the DC/DC Converter.

Summary and Analysis of the Results

Increase in Available Energy

As shown by the results presented in Table 2 below, the use of a commercial DC/DC Converter has allowed access to a wider cell voltage window than would be the case if the minimum cell voltage was set to be the same as the minimum voltage acceptable to the system or application.

In the case of Experiment 2, the decrease in available energy (−7.61%) is due to the converter consuming energy during its operation.

In the case of Experiment 3, the total energy benefit is an increase in usable energy of approximately 10% ((353.4−322)/322). Such a significant increase in available energy will allow important, hitherto unrealised, commercial advantages to be gained in the use of sodium-ion cells.

TABLE 2

| Expt. | Battery Voltage Window | DC/DC Converter | Apparent Voltage at Electronic Load | Electronic Load | Battery Pack Energy Input to VCD | Total Energy output by VCD | Energy efficiency Of VCD | Increase in Available Energy | Total Mass Kg | Specific Energy Density Wh/Kg |
|---|---|---|---|---|---|---|---|---|---|---|
| 1 | 56 V-35 V | No | 56 V-35 V | 295 W | 322 Wh | 322 Wh | 100% | 0.00% | 8.825 | 36.5 |
| 2 | 56 V-35 V | Yes | 48 V | 295 W | 322 Wh | 297.5 Wh | 92.38% | −7.61% | 10.5 | 28.4 |

TABLE 2-continued

| Expt. | Battery Voltage Window | DC/DC Converter | Apparent Voltage at Electronic Load | Electronic Load | Battery Pack Energy Input to VCD | Total Energy output by VCD | Energy efficiency Of VCD | Increase in Available Energy | Total Mass Kg | Specific Energy Density Wh/Kg |
|---|---|---|---|---|---|---|---|---|---|---|
| 3 | 56 V-18 V | Yes | 48 V | 295 W | 390.55 Wh | 353.4 Wh | 90.49% | 9.75% | 10.5 | 33.7 |
| Sim. Model Calc. A: | 56-18 V | Yes | 48 V | 295 W | 390.55 Wh | 378.82 | 97% | 17.6% | | |
| Sim. Model Calc. C MeanWell converter | 56 V-18 V | Yes below 38 V | 56 V-38 V | 295 W | 390.55 Wh | 380 Wh | 97.30% | 18.01% | 10.5 | 36.2 |
| Sim. Model Calc. B: Vicor converter | 56 V-18 V | Yes below 38 V | 56 V-38 V | 295 W | 390.55 Wh | 381.5 Wh | 97.7% | 18.47% | 9.08 | 41.9 |

Simulated Model 1—Calculation A

It is envisaged that the percentage improvement in available energy will be increased with the use of a more efficient DC/DC Converter, for example, it can be calculated that using a commercially available converter under the conditions of Experiment 3 but with an average converter efficiency of 97% will provide a total energy increase of 17.5%. Simulated Model 2—Calculation B (Operating a DC/DC Converter Only when the Battery Pack Voltage Approaches the Minimum Operating Voltage of the Application Device being Powered by the Battery Pack)

Figure 7:
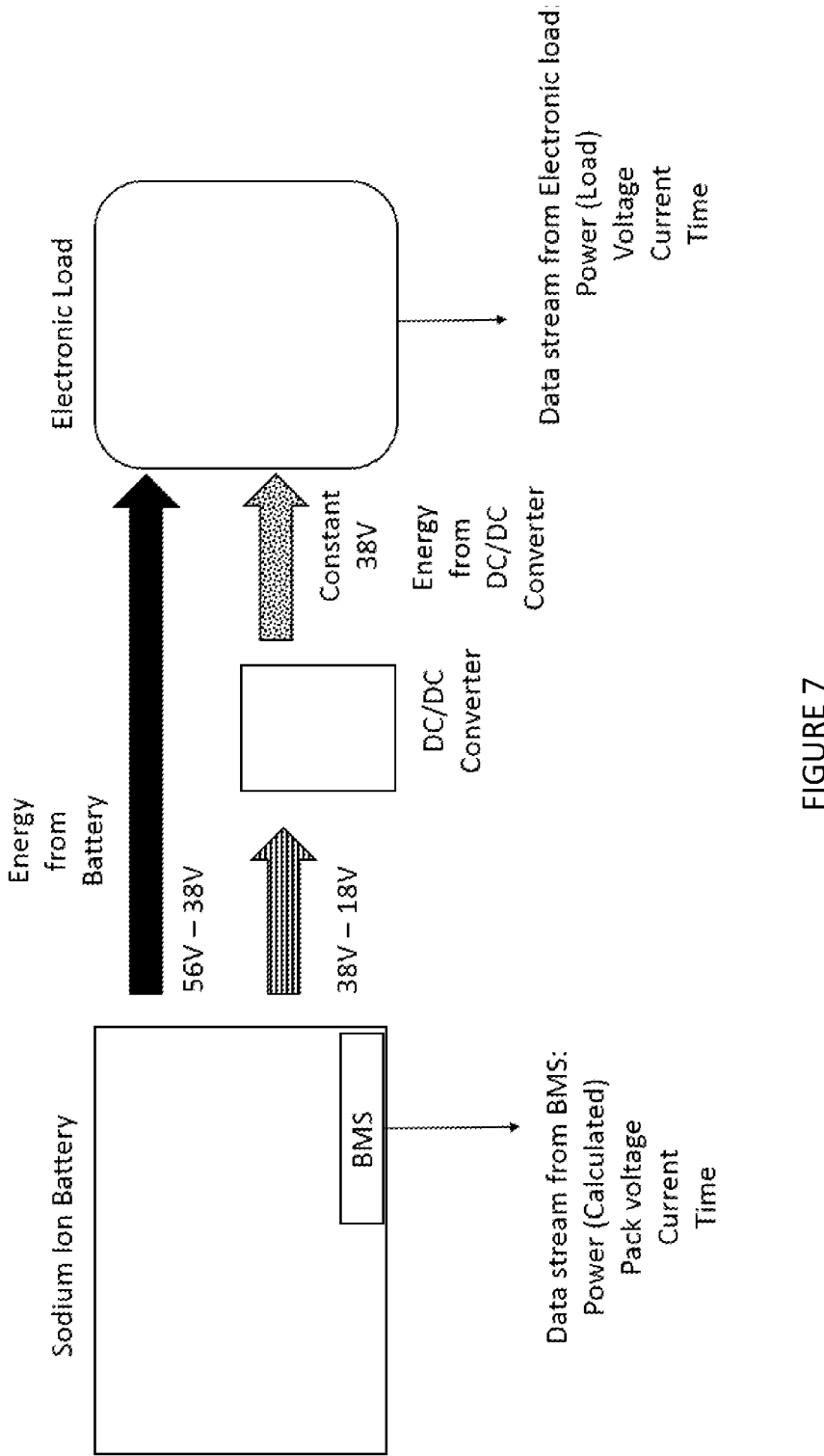
FIG. 7 a schematic representation of a simulated model sodium-ion battery pack according to the present invention, as used in calculation B, which assumes that the battery pack is discharged between 56V and 18V, but with the DC/DC Converter only used below 38V. The results indicate that the energy losses caused by the addition of a DC/DC converter would be minimised.

This simulated experiment models the amount of energy expected to be accessible when a DC/DC converter in a battery pack identical to that used in Experiment 3, is operated only when the battery pack voltage approaches the cut-off voltage, so as to reduce parasitic loads on the battery pack. A schematic representation of this simulated model battery pack is given in FIG. 7.

Assuming that the application device to be powered by the battery pack has a minimum operating voltage of 35V, and that the battery pack is designed to have an apparent lower voltage limit of 38V (slightly higher than the 35V to prevent switching out). then this may be achieved if the battery is initially operated as Experiment 1 (no converter) until the 38V limit was reached, and the DC/DC converter could be operated to take over and supply a constant voltage at the load terminals of 38V until the 18V battery limit is reached.

As mentioned above, the battery pack used in this simulated experiment is the same as that in Experiment 3, consequently, the battery pack output energy will be 390.55 Wh, because the battery pack would be operating in the same voltage window of 56V to 18V.

Also, from the data gathered in Experiment 3, the Battery Output energy between 56V and 38V is 299.9 Wh. As the DC/DC converter is not operating in this voltage window, there is no energy loss.

Figure 8:
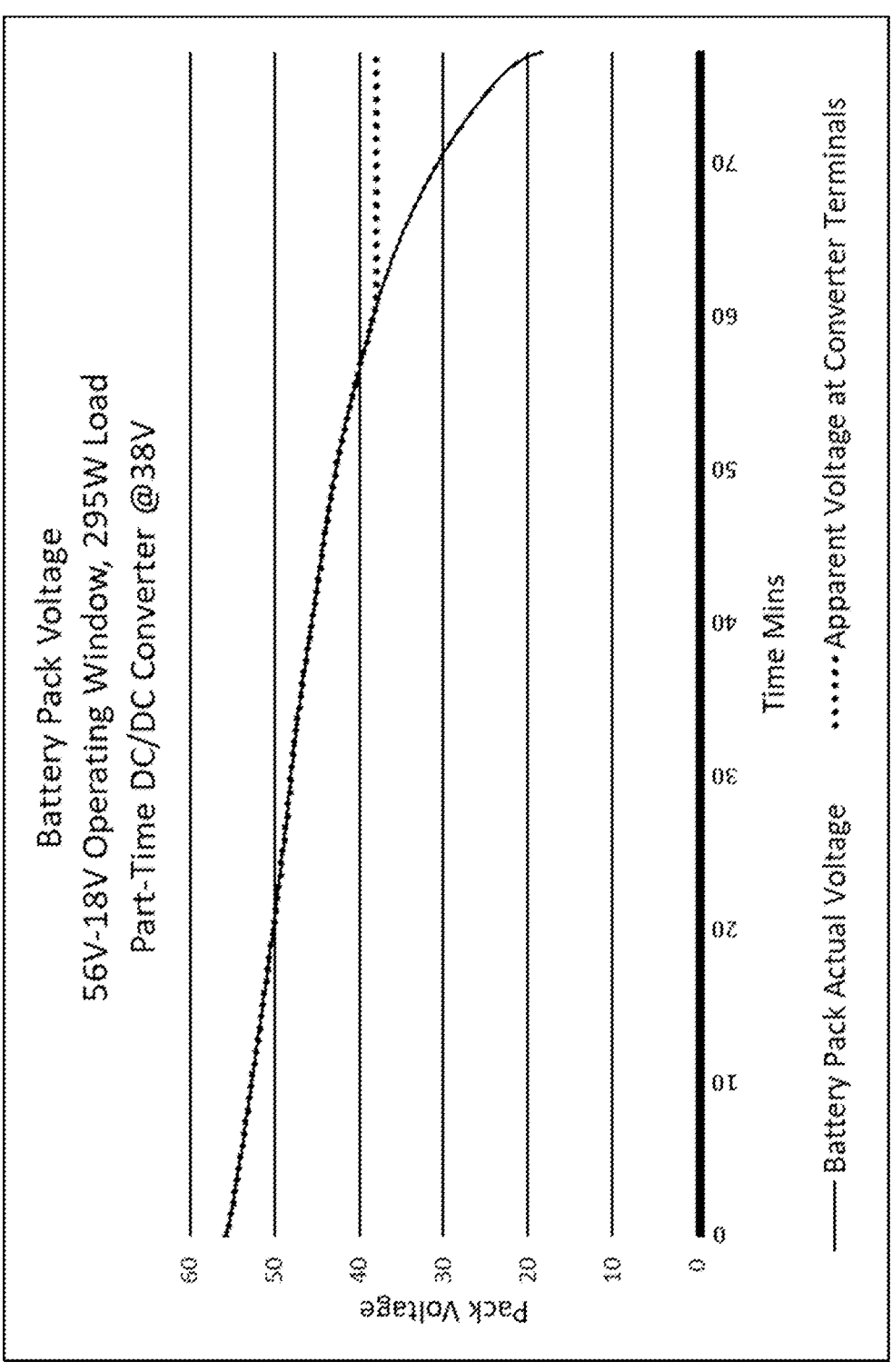
FIG. 8 shows a simulated model discharge profile for a hypothetical Na-ion battery pack according to the present invention (simulated model 2) as used in calculation B (with a voltage converter) connected to a 295 W load and discharged within in a 56 V-18 V operating window, with the voltage converter only being operated when the discharge voltage had fallen to 38 V.

Assuming the efficiency of the DC/DC converter is around 90%, below 38V it would be expected to boost the battery output voltage to 38V. A suitable converter for this example would include a Vicor Corporation DCM3414× 50M53C2yzz that has an efficiency of approximately 90%. FIG. 8 shows a simulated model discharge profile for the Na-ion battery pack on which this calculation B is based.

From the results given above in Table 2 for Experiment 3, the energy available from the battery between 38V and 18V, (with a DC/DC converter), is (390.55 Wh–299.9 Wh)=90.65 Wh, therefore the extra energy available to the load would be 90.65 Wh*90%=81.6 Wh This would give the battery pack and part-time DC/DC Converter system a Total Energy Output of (299.9 Wh+81.6 Wh)=381.5 Wh with an overall (averaged over 56V to 18V) efficiency of 97.7%

Thus, the Total Output Energy for this simulation model represents an 18.47% increase relative to the reference, Experiment 1. This is also an increase over and above Simulated model A Simulated Model 3—Also Calculation B but Using a Reduced Mass DC/DC Converter to increase the available Specific Energy Density of a Battery Pack An increase in the available specific energy density (Wh/Kg) may be obtained as a result of reducing the weight of the DC/DC converter. The Mean Well converter is not the best converter for this purpose because of its high mass, (See calculation C) however, a converter from Vicor Corporation (DCM3414×50M53C2yzz), is low weight and has an efficiency which matches the Mean Well converter in the low voltage range. Thus, it can be calculated that operating a Vicor Power converter only in the range below 38 and 18V leads to an increase in the available pack specific energy density between 56 and 38V of ~15%. From Table 2 above: ((41.9–36.5)/36.5)*100)

Simulated Model 4—Calculation D (Investigation Using a Reduced Mass DC/DC Converter to Increase the Available Cell Specific Energy Density)

It is preferable to secure an increase in the available cell specific energy as well as the available pack specific energy since this gives greater flexibility in pack design. A comparison of the cells alone in Experiment 1, which weighed 4.90 kg, with the same cells in conjunction with a Vicor Power converter, which together weighed 5.16 kg, used only in the range below 38 and 18V leads to an increase in the available cell specific energy density between 56 and 38V from 65.7 Wh/kg (322/4.9) to 74 Wh/kg (381.5/5.16) an increase of 13%.

Simulated Model 5—Calculation E (Investigation Using a Reduced Volume DC/DC Converter to Increase the Battery Pack Available Volumetric Energy Density)

In order to secure an increase in the volumetric energy density as a result of using a DC/DC converter, a low volume converter needs to be used. The converter from Vicor Corporation (DCM3414×50M53C2yzz), is low volume and has a good efficiency. A comparison of the pack alone in Experiment 1 which had a volume of 6.696 l with the same pack in conjunction with a Vicor Power converter, which together had a volume of 6.725 lt, used only in the range below 38 and 18V leads to the available volumetric energy density between 56 and 38V increasing from 48.1 Wh/l(322/6.696) in Experiment 1 to 56.7 Wh/l (381.5/6.725) an increase of 18% Increase in available pack volumetric energy Simulated Model 6—Calculation F (Investigation Using a Reduced Volume DC/DC Converter to Increase the Available Cell Volumetric Energy Density)

It is preferable to secure an increase in the available cell volumetric energy density as well as the available pack volumetric energy density since that gives greater flexibility in pack design. A comparison of the cells alone in Experiment 1 which had a volume of 4.416 litres with the same cells in conjunction with a Vicor Power converter, which together had a volume of 4.445 litres, only in the range below 38 and 18V leads to the available volumetric energy density between 56 and 38V increasing from 72.9 Wh/litre (322/4.416) in Experiment 1 to 85.8 Wh/l(381.5/4.445) an increase of 18% Increase in available cell specific energy density.

As the above live battery pack and simulated model experiments demonstrate, the inclusion of a DC/DC converter produces an unexpected increase in the available energy, the specific energy density and an increase in the volumetric energy density, not only for a sodium-ion battery pack but also for the individual sodium-ion cells such a battery pack contains. What is particularly surprising is that these improved results can be obtained even when the inclusion of the DC/DC converter adds weight (and volume) to the sodium-ion cells; nevertheless, as the above simulated model calculations show, even further specific energy densities increases are expected when a DC/DC converter with an optimised mass and efficiency is used. These results are commercially very advantageous since a sodium-ion battery pack according to the present invention has the potential to be light and compact, for less energy to be retained in the cells and therefore wasted, for longer times between charge cycles and for fewer cells to be required for any particular application.

The invention claimed is:

1. A sodium-ion battery pack comprising one or more sodium-ion cells and one or more voltage converters; wherein the one or more sodium-ion cells are operable between a minimum operating voltage (cell Vmin) in the range >0.0 V to <2.0 V and a maximum operating voltage (cell Vmax) in the range >3.60 V to <4.30 V; and when the sodium-ion battery pack comprises two or more sodium-ion cells, all of the two or more sodium-ion cells have the same cell nominal voltage profile and the same electrochemical design.

2. The sodium-ion battery pack according to claim 1, further comprising a battery management system (BMS).

3. The sodium-ion battery pack according to claim 1, wherein all of the one or more sodium-ion cells are operable in a voltage range where cell Vmin is from >0% to 55% of cell Vmax.

4. The sodium-ion battery pack according to claim 1, wherein the one or more sodium-ion cells are operable between cell Vmax in the range >3.70 V to ≤4.25 V.

5. The sodium-ion battery pack according to claim 1, wherein each of the one or more voltage converters is connected to more than one sodium-ion cell.

6. The sodium-ion battery pack according to claim 1, wherein at least one of the one or more voltage converters is a DC/DC converter.

7. The sodium-ion battery pack according to claim 6, wherein the at least one DC/DC converter is a bidirectional DC/DC converter.

8. The sodium-ion battery pack according to claim 7, wherein the bidirectional DC/DC converter is selected from a Boost converter and/or a Buck/Boost Converter.

9. The sodium-ion battery pack according to claim 1, wherein at least one of the one or more voltage converters is either a piece of stand-alone circuitry or it is incorporated into or linked to a battery management system (BMS).

10. A method comprising:
delivering an amount of specific energy with the sodium ion battery pack according to claim 1, wherein the following condition is satisfied:

(Difference in Energy between a battery Vmax and 0V) multiplied by (Efficiency of the one or more voltage converters)/(Mass of the one or more sodium-ion cells+Mass of the one or more voltage converters)>(Difference in Energy between the battery Vmax and 60 to 70% of the battery Vmax)/Mass of the one or more sodium-ion cells; and wherein the battery Vmax is determined as the maximum output voltage of the sodium-ion battery pack comprising the one or more sodium-ion cells in the absence of the one or more voltage converters.

11. A method of accessing the energy available from a battery comprising one or more sodium-ion cells, comprising the steps of:
a) providing a sodium-ion battery pack comprising one or more voltage converters and one or more sodium-ion cells, wherein the one or more sodium-ion cells are operable between a minimum operating voltage (cell Vmin) in the range >0 to <2.0 V and a maximum operating voltage (cell Vmax) in the range >3.6 V to <4.30 V; and further wherein when the sodium-ion battery pack comprises two or more sodium-ion cells, all of the two or more sodium-ion cells have the same cell nominal voltage profile and the same electrochemical design
b) associating or integrating the sodium-ion battery pack with an electronic application device, and
c) directly or indirectly operating at least one of the one or more voltage converters to increase the output voltage of the sodium-ion battery pack to more than 60% of battery Vmax;
wherein battery Vmax is determined as the design maximum output voltage of the sodium-ion battery pack comprising the one or more sodium-ion cells in the absence of the one or more voltage converters.

12. The method according to claim 11, wherein the at least one of the one or more voltage converters is operated discontinuously throughout some or all of the operating voltage range of the electronic application device.

13. The method according to claim 11, wherein the at least one voltage converter is operated when the output voltage of the at least one sodium-ion cell of the sodium-ion pack is at or below 60% of Vmax.

14. The method according to claim 11, wherein the sodium-ion battery pack delivers a specific energy at least 3% greater than the specific energy delivered by a sodium-ion battery pack, which comprises one or more sodium-ion cells in the absence of one or more voltage converters.

15. The method according to claim 11, wherein the sodium-ion battery pack delivers a volumetric energy density at least 3% greater than the volumetric energy density delivered by a sodium-ion battery pack, which comprises one or more sodium-ion cells in the absence of one or more voltage converters.

16. An electronic application device which is integrated or associated with a sodium-ion battery pack according to claim 1.

17. The sodium-ion battery pack according to claim 3, wherein all of the one or more sodium-ion cells are operable in a voltage range where cell Vmin is from >0% to 50% of cell Vmax.

18. The sodium-ion battery pack according to claim 3, wherein all of the one or more sodium-ion cells are operable in a voltage range where cell Vmin from >0% to 45% of cell Vmax.

19. The sodium-ion battery pack according to claim 4, wherein the one or more sodium-ion cells are operable between cell Vmax in the range >3.8 V to ≤4.20 V.

*   *   *   *   *